(12) United States Patent
Teraoka et al.

(10) Patent No.: US 9,536,666 B2
(45) Date of Patent: Jan. 3, 2017

(54) MULTI-LAYER CERAMIC CAPACITOR

(71) Applicant: TAIYO YUDEN CO., LTD., Taito-ku, Tokyo (JP)

(72) Inventors: Hideya Teraoka, Takasaki (JP); Koichiro Morita, Takasaki (JP); Youichi Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 74 days.

(21) Appl. No.: 14/389,308

(22) PCT Filed: Nov. 13, 2012

(86) PCT No.: PCT/JP2012/079409
§ 371 (c)(1),
(2) Date: Sep. 29, 2014

(87) PCT Pub. No.: WO2014/002302
PCT Pub. Date: Jan. 3, 2014

(65) Prior Publication Data
US 2015/0279565 A1 Oct. 1, 2015

(30) Foreign Application Priority Data
Jun. 29, 2012 (JP) ................. 2012-146611

(51) Int. Cl.
*H01G 4/30* (2006.01)
*H01G 4/12* (2006.01)

(52) U.S. Cl.
CPC .......... *H01G 4/1227* (2013.01); *H01G 4/1209* (2013.01); *H01G 4/30* (2013.01)

(58) Field of Classification Search
CPC ............ H01G 4/12; H01G 4/30; H01G 4/228
USPC .................... 361/301.4, 321.1, 321.2, 321.4, 301.2, 361/306.1, 306.3
See application file for complete search history.

(56) References Cited

U.S. PATENT DOCUMENTS

| 6,258,450 B1 | 7/2001 | Sasaki et al. |
| 7,786,036 B2 * | 8/2010 | Komatsu ............. C04B 35/4682 501/139 |
| 2009/0059471 A1 * | 3/2009 | Fukuda ................ H01G 4/1227 361/321.4 |
| 2011/0205686 A1 | 8/2011 | Yamaguchi |

FOREIGN PATENT DOCUMENTS

| JP | H10-255549 A | 9/1998 |
| JP | 2000-095563 A | 4/2000 |

(Continued)

OTHER PUBLICATIONS

International Search Report (ISR), mailed Jan. 8, 2013, issued for International Application No. PCT/JP2012/079409.

*Primary Examiner* — Nguyen Ha
(74) *Attorney, Agent, or Firm* — Law Office of Katsuhiro Arai

(57) ABSTRACT

A multi-layer ceramic capacitor has a laminate of dielectric layers and internal electrode layers laminated alternately with one another, as well as cover layers formed as the outermost layers at the top and bottom of the laminate in the laminating direction, wherein the dielectric layers are constituted by a sintered compact containing a barium titanate and a silicon compound, and a fresnoite phase having an average grain size of 1 μm or less is present in the dielectric layers.

20 Claims, 1 Drawing Sheet

(56) References Cited

FOREIGN PATENT DOCUMENTS

| | | |
|---|---|---|
| JP | 3326513 B2 | 9/2002 |
| JP | 2006-173352 A | 6/2006 |
| JP | 2011-068524 A | 4/2011 |
| JP | 2011-173747 A | 9/2011 |
| JP | 2012-036083 A | 2/2012 |

* cited by examiner

MULTI-LAYER CERAMIC CAPACITOR

This application is the U.S. National Phase under 35 U.S.C. §371 of International Application PCT/JP2012/079409, filed Nov. 13, 2012, which claims priority to Japanese Patent Application No. 2012-146611, filed Jun. 29, 2012. The International Application was published under PCT Article 21(2) in a language other than English.

TECHNICAL FIELD

The present invention relates to a multi-layer ceramic capacitor of high dielectric constant and high reliability.

BACKGROUND ART

The demand for smaller electronic components has been strong in recent years in response to the development of more densely mounted electronic circuits for use in mobile phones and other digital electronic devices, and consequently multi-layer ceramic capacitors that constitute these circuits are rapidly becoming smaller in size and larger in capacity.

The capacity of a multi-layer ceramic capacitor is directly proportional to the dielectric constant of the material used for the dielectric layers constituting the capacitor and also to the number of dielectric layers, and inversely proportional to the thickness of one dielectric layer. This means that, to meet the demand for smaller size, the dielectric constant of the material must be raised, thickness of the dielectric layer reduced, and number of dielectric layers increased.

To meet the aforementioned demand for smaller size (such as reducing the thickness of the dielectric layer to 3 µm or less) and larger capacity, attempts have been made to improve the dielectric constant of the dielectric porcelain composition that constitutes the dielectric layers of the multi-layer ceramic capacitor.

Ways to improve the dielectric constant include to bake the materials for secondary constituents beforehand and then add the baked powders to the material for the primary constituent to increase the dispersibility of secondary constituents, as well as to add secondary constituents as individual oxides and then adjust them to specified compositions to achieve a higher dielectric constant (Patent Literatures 1 and 2).

However, these approaches, although leading to a higher dielectric constant, present problems such as causing other characteristics to drop, especially when the composition ratios of secondary constituents are changed for the purpose of improving the dielectric constant. Accordingly, the method of producing desired segregation and thus controlling the solid solution states of added elements is employed to improve the dielectric constant without causing other characteristics to drop.

To meet the demand for smaller size/larger capacity, a greater number of thinner layers must be laminated, as mentioned above, in addition to improving the dielectric constant. In Patent Literature 3, $MgTiO_3$ is added to the dielectric layer-forming material to produce a segregation phase containing Mg and Si so as to improve the dielectric constant, as a way to improve the dielectric constant without causing other characteristics to drop.

PRIOR ART LITERATURES

Patent Literatures

Patent Literature 1: Japanese Patent Laid-open No. Hei 10-255549

Patent Literature 2: Japanese Patent No. 3326513

Patent Literature 3: Japanese Patent Laid-open No. 2006-173352

SUMMARY OF THE INVENTION

Problems to be Solved by the Invention

To make the dielectric layer thinner, the size of dielectric grains must be made as small as possible. However, reducing the graingrain size causes the dielectric constant per grain to drop due to the sizing effect. Under the method of adding $MgTiO_3$ as disclosed in Patent Literature 3, dielectric grains are sintered in a state of low per-grain dielectric constant because Mg has the effect of suppressing the growth of these dielectric grains, which presents the problem of not being able to achieve sufficient dielectric constant.

The object of the present invention is to provide a multi-layer ceramic capacitor that achieves higher dielectric constant and thinner layers, while also offering excellent insulation reliability, in order to solve the aforementioned problems and meet the demand for smaller size/larger capacity.

Means for Solving the Problems

After studying in earnest to solve the aforementioned problems, the inventors of the present invention found that a multi-layer ceramic capacitor wherein a fresnoite phase having an average grain size of 1 µm or less is present either in its dielectric layer or on the internal electrode interface, could solve the aforementioned problems, and consequently completed the present invention.

To be specific, the present invention is a multi-layer ceramic capacitor having a laminate of dielectric layers and internal electrode layers laminated alternately with one another, as well as cover layers formed as the outermost layers at the top and bottom of the laminate in the laminating direction; wherein the dielectric layers are constituted by a sintered compact containing a barium titanate and a silicon compound, and a fresnoite phase having an average grain size of 1 µm or less is present in the dielectric layers.

The fresnoite phase is at least partially present on the interface between the dielectric layer and internal electrode layer.

Preferably the dielectric layers contain 0 to 4 mol of magnesium oxide per 1 mol of the silicon compound, from the viewpoint of achieving favorable formation of fresnoite phase and appropriate grain growth.

Preferably the silicon compound is silicon dioxide, from the viewpoint of favorable formation of fresnoite phase. Also from a similar viewpoint, preferably the silicon compound is contained by 0.5 to 5 mol per 100 mol of the barium titanate in the dielectric layers.

With the multi-layer ceramic capacitor proposed by the present invention, the abundance of the fresnoite phase in the dielectric layers is normally 0.5 to 3%.

With the multi-layer ceramic capacitor proposed by the present invention, the dielectric layers may contain various additive compounds so as to add various characteristics to the constituent grains of the sintered compact. Particularly from the viewpoint of the life of the multi-layer ceramic capacitor, preferably the dielectric layers further contain oxides of rare earth elements.

Effects of the Invention

The dielectric layers of the multi-layer ceramic capacitor proposed by the present invention have an excellent dielectric constant because a fresnoite phase is present in them, and furthermore the fresnoite phase, whose average grain size is 1 μm or less, is dispersed in the dielectric layers without causing excessive segregation. As a result, the electric layers can be made thinner while achieving a high dielectric constant at the same time, and also because the fresnoite phase has high insulation property, the multi-layer ceramic capacitor proposed by the present invention presents excellent insulation reliability, as well.

MODE FOR CARRYING OUT THE PRESENT INVENTION

Figure 1:
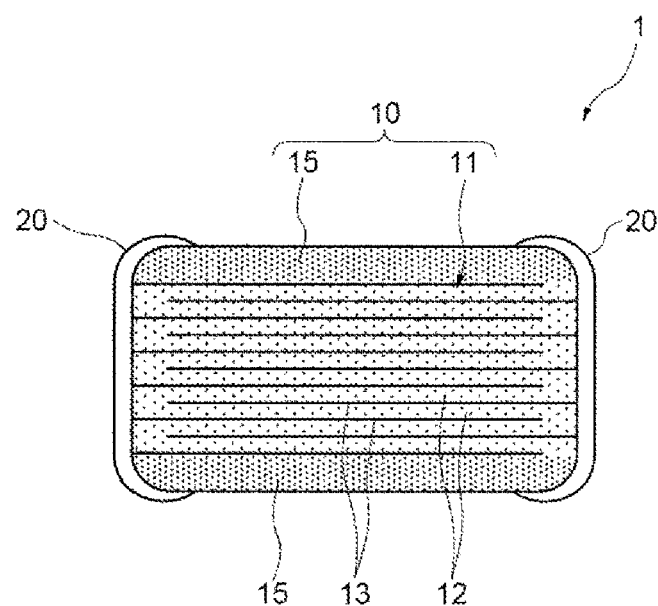
FIG. 1 is a schematic longitudinal cross-section view of a multi-layer ceramic capacitor in an embodiment of the present invention.

The following explains a multi-layer ceramic capacitor in an embodiment of the present invention. FIG. 1 is a schematic longitudinal cross-section view of a multi-layer ceramic capacitor 1 conforming to the present invention.

The multi-layer ceramic capacitor 1 is basically constituted by a ceramic sintered compact 10 of specified chip dimensions and shape (such as rectangular solid of 1.0×0.5× 0.5 mm), as well as a pair of external electrodes 20 formed on both sides of the ceramic sintered compact 10. The ceramic sintered compact 10 is made of barium titanate grain crystal as its primary constituent, and has a laminate 11 inside which is constituted by dielectric layers 12 and internal electrode layers 13 laminated alternately with one another, as well as cover layers 15 formed as the outermost layers at the top and bottom in the laminating direction.

The laminate 11 has a densely packed multi-layer structure comprised of several tens to hundreds of layers in total, where the thickness of one dielectric layer 12 sandwiched by two internal electrode layers 13 is 3 μm or less (such as approx. 1 μm), according to the capacitance, required pressure resistance and other specifications.

The cover layers 15 formed as the outermost layers of the laminate 11 protect the dielectric layers 12 and internal electrode layers 13 from contamination by moisture, contaminants and other substances entering from the outside and thereby prevent these layers from deteriorating over time.

The multi-layer ceramic capacitor 1 is manufactured as follows, for example. First, a fine grain material powder whose primary constituent is a barium titanate is wet-mixed with additive compounds, after which the obtained mixture is dried and crushed to prepare a ceramic powder.

A barium titanate is a tetragonal compound of perovskite structure that exhibits a high dielectric constant. This barium titanate is generally obtained by causing titanium dioxide or other titanium material to react with barium carbonate or other barium material, to synthesize a barium titanate. This barium titanate is made into a powder of desired grain size by means of heat treatment and sintering.

There are various traditional methods to synthesize a barium titanate; for example, the sol-gel method, hydrothermal method, and solid phase method are known, among others. Any of these methods can be employed under the present invention.

The barium titanate powder thus obtained is crushed to adjust the grain size or combined with a classification process, as necessary, to fine-tune the grain size. The average grain size of this barium titanate powder is normally 0.2 μm or less, or preferably 0.08 to 0.15 μm. The barium titanate powder is further mixed with various additive compounds to prepare a ceramic powder as mentioned above.

Under the present invention, a silicon compound is used as one such additive compound. When a material powder containing a barium titanate and a silicon compound is sintered, these constituents will react with each other to form a fresnoite phase in the sintered compact obtained from the aforementioned sintering, to achieve a high dielectric constant and insulation property.

The silicon compound may be silicon dioxide or $BaSiO_3$, for example, of which silicon dioxide is preferred from the viewpoint of easy access to its material and favorable formation of fresnoite phase.

While the sintered compact constitutes the dielectric layers 12 of the multi-layer ceramic capacitor 1 proposed by the present invention, the content of the silicon compound in these dielectric layers 12 is normally 0.5 to 5 mol per 100 mol of barium titanate. The higher the content of silicon compound, the better as it facilitates the formation of fresnoite phase; however, blending too much silicon compound causes more fresnoite phase to be formed, which tends to cause the characteristics of the multi-layer ceramic capacitor to drop. For this reason, the content of the silicon compound is preferably 0.5 to 3 mol per 100 mol of barium titanate.

Examples of the aforementioned additive compounds further include MgO, MnO, oxides of rare earth elements (Y, Dy, Tm, Ho, and Er), as well as oxides of Y, Sm, Eu, Gd, Tb, Er, Tm, Cr, V, Mn, Co, Ni, Nb, Ta, Mo, W, Li, B, Na, and K.

MgO (magnesium oxide) is an important element needed to suppress the production of oxygen defects when the internal electrodes are sintered under reducing process in the manufacture of the multi-layer ceramic capacitor. However, MgO is easily dissolved in barium titanate and consequently causes the reactivity of barium titanate with silicon compound to drop, thereby making it difficult to form a fresnoite phase. MgO also has the effect of suppressing the growth of dielectric layer constituent grains in the sintering process through which the dielectric layers 12 are formed.

In light of the above, the content of MgO in the dielectric layer 12 is generally 2 mol or less per 100 mol of barium titanate, and preferably 0 to 4 mol per 1 mol of silicon compound. More preferably the content of MgO in the dielectric layer 12 is 0 to 0.3 mol per 1 mol of silicon compound.

In addition, the aforementioned MnO (manganese oxide) has the effect of improving the insulation resistance and high-temperature load life of the multi-layer ceramic capacitor, and its content in the dielectric layer 12 is normally 0.5 mol or less per 100 mol of barium titanate.

Furthermore, the aforementioned oxides of rare earth elements have the effect of improving the high-temperature load life of the multi-layer ceramic capacitor, and their content in the dielectric layer 12 is normally 2 mol or less per 100 mol of barium titanate.

Among the various additive compounds other than the silicon compound explained above, it is preferable to add oxides of rare earth elements in order to add high-temperature load life characteristics to the dielectric layers 12 constituted by the sintered compact.

The additive compounds explained above, together with silicon compound, are added to and blended with barium titanate. The respective constituents are blended so that when the obtained ceramic powder is sintered to form dielectric layers 12, their contents will conform to the aforementioned ratios, after which the constituents are wet-mixed and then dried and crushed to prepare a ceramic powder.

The ceramic powder obtained as above is wet-mixed with polyvinyl butyral resin or other binder, ethanol, toluene or other organic solvent, and dioctyl phthalate (DOP) or other plasticizer. The obtained slurry is used to be applied on a substrate to form a band-shaped dielectric green sheet of 3 µm or less in thickness, using the die-coater method or doctor blade method, for example, and then the sheet is dried. Then, on the surface of the dielectric green sheet, a metal conductive paste containing organic binder is printed by screen printing or gravure printing, to arrange a pattern of internal electrode layers 13. For the aforementioned metal, nickel is widely used from the viewpoint of cost.

The metal conductive paste can have a barium titanate of 50 nm or less in average grain size uniformly dispersed in it as a common material. Thereafter, identical dielectric green sheets that have been stamped to the dimensions of 15 cm×15 cm, for example, are laminated by a specified number of layers (such as 10 to 500 layers) so that the internal electrode layers 13 and dielectric layers 12 lie alternately. Cover sheets to form cover layers 15 are then pressure-bonded at the top and bottom of the laminated dielectric green sheets, and then the sheets are cut to specified chip dimensions (such as 4.0 mm×2.0 mm), after which a Ni conductive paste to form external electrodes 20 is applied on both side faces of the cut laminate and then dried. This way, a compact of multi-layer ceramic capacitor 1 is obtained.

The compact of multi-layer ceramic capacitor 1 thus obtained is placed in a $N_2$ ambience of approx. 350° C. to remove the binder, after which the compact is sintered, normally for 10 minutes to 2 hours at 1100 to 1300° C., in the presence of a mixture gas of $N_2$, $H_2$, and $H_2O$ (where the partial oxygen pressure is approx. $1.0 \times 10^{-11}$ MPa), as a result of which the compounds constituting the dielectric green sheets (barium titanate, silicon compound, etc.) are sintered and at least parts of barium titanate and silicon compound undergo reaction, to form a fresnoite phase ($Ba_2TiSi_2O_8$). The foregoing gives a multi-layer ceramic capacitor 1 having a laminate 11 inside which is constituted by alternately layered dielectric layers 12 made of sintered compact and internal electrode layers 2, as well as cover layers 15 formed as the outermost layers at the top and bottom in the laminating direction. While $Ba_2TiSi_2O_8$ was cited in the example of fresnoite phase, the fresnoite phase may be a variation of the one in the aforementioned example where Ba is partially substituted by Sr or Ca, or Ti is partially substituted by Zr; or specifically a variation expressed by the formula $Ba_{2-x-y}Ca_xSr_yTi_{1-z}Zr_zSi_2O_8$ ($0 \leq x < 2$, $0 \leq y < 2$, $0 \leq x+y < 2$, $0 \leq z < 1$).

Further under the present invention, the insulation property of the multi-layer ceramic capacitor can be improved by performing re-oxidization treatment at 600 to 1000° C.

The fresnoite phase is present in the dielectric layer 12 or on the interface between the dielectric layer 12 and internal electrode layer 13, and the silicon compound is uniformly dispersed in the dielectric layer 12, and therefore the segregation of fresnoite phase does not increase much.

Figure 2:
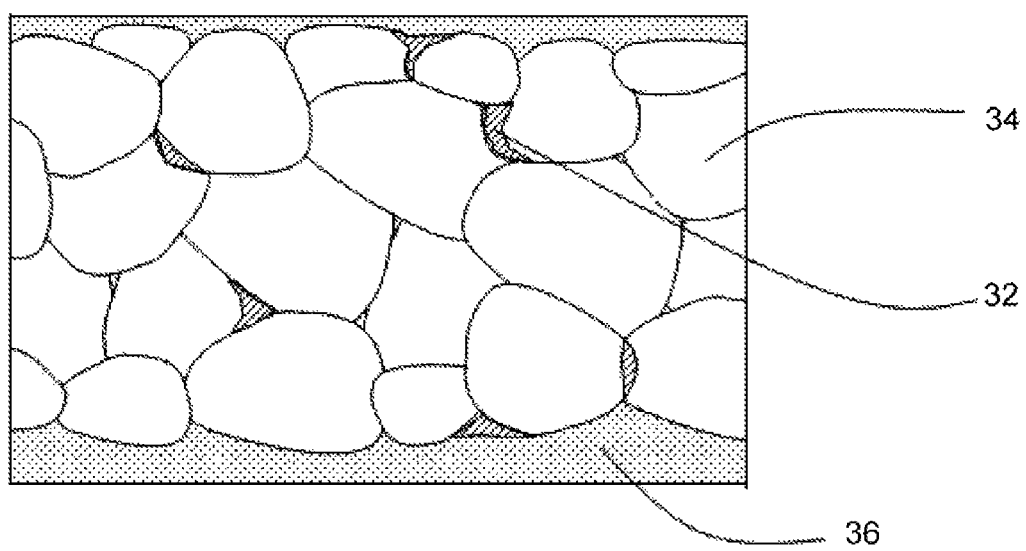
FIG. 2 is an enlarged schematic view of where the dielectric layers and internal electrode layers are laminated with one another, in a longitudinal cross-section view, similar to FIG. 1, of a multi-layer ceramic capacitor conforming to the present invention.

As shown in FIG. 2, for example, a fresnoite phase 32 is present in a manner contacting dielectric grains 34 constituted by a barium titanate and dielectric grains 34 constituted by other compounds, or in a manner contacting the dielectric grains 34 and an internal electrode 36 (their interface). The fresnoite phase can be present in any form. FIG. 2 is an enlarged schematic view of where the dielectric layers and internal electrode layers are laminated with one another, in a longitudinal cross-section view, similar to FIG. 1, of a multi-layer ceramic capacitor conforming to the present invention.

Under the present invention, the average grain size of the fresnoite phase as measured with a TEM-EDS (transmission electron microscope energy-dispersive X-ray spectroscopy) is 1 µm or less, and the finer the fresnoite phase present in the dielectric layer 12, the easier it is to achieve a high dielectric constant. From this viewpoint, the average grain size of the fresnoite phase is preferably 300 to 600 nm.

The average grain size of the fresnoite phase is measured as follows. First, a longitudinal cross-section of the multi-layer ceramic capacitor 1 is captured with a TEM-EDS in such a way that its dielectric layer 12 and internal electrode layer 13 appear in an area of 15 µm×15 µm on the photograph. Next, the entire fresnoite phase in the captured area of 15 µm×15 µm is measured to obtain maximum diameter a in the direction parallel with the internal electrode layer 13, as well as maximum diameter b in the direction vertical to the internal electrode layer 13, and (a+b)/2 is calculated. The result represents the grain size. Next, average grain size A of the fresnoite phase is calculated. Similar measurement is performed at a minimum of 20 locations to obtain average A in each measured location, and average B calculated from all average A values represents the average grain size of the fresnoite phase.

The fresnoite phase has high insulation property, which makes the multi-layer ceramic capacitor 1 a product offering excellent insulation reliability, long life, and superior cost performance. Particularly when the fresnoite phase is present on the interface between the dielectric layer 12 and internal electrode layer 13, these benefits are further augmented.

Additionally, when a fresnoite phase is formed, the crystal lattice of barium titanate (of perovskite structure) present around the fresnoite phase has missing A sites. As a result, dissolution of additive compounds into barium titanate is promoted, and so is the grain growth due to sintering, and the dielectric constant per grain increases as a result. Consequently, the dielectric constant of the obtained multi-layer ceramic capacitor 1 increases.

With the multi-layer ceramic capacitor 1 under the present invention, the abundance of the fresnoite phase in the dielectric layer 12 is normally 0.5 to 3%, or preferably 0.5 to 1% from the viewpoint of good dielectric constant and insulation property. The abundance is measured as follows. A binary image is photographed, in a view field of 15 µm×15 µm, on a surface of the dielectric layer 12 running parallel with the internal electrode layer 13, using a TEM-EDS that has been set in such a way that areas of higher Si concentration are shown with higher brightness. On the obtained photograph, the area ratio of the higher-brightness areas to the overall dielectric layer represents the area ratio of fresnoite phase. Similar measurement is performed at a minimum of 20 locations and the area ratio of fresnoite phase is obtained in each measured location, with the average of these area ratios calculated as the abundance of fresnoite phase.

As explained above, the extent of formation of fresnoite phase can be adjusted by means of adjusting the contents of barium titanate and silicon compound as well as the content of magnesium oxide.

Also, while the fresnoite phase can be identified by various methods, it can be checked by TEM-EDS composition analysis, as well. The fresnoite phase can also be confirmed by confirming a crystal structure from an electron beam diffraction pattern. Another way to identify the fresnoite phase is to look for Ti-L2, 3 edge shape changes in an EELS (electron energy loss spectroscopy) spectrum because the fresnoite phase has a $TiO_5^{6-}$ structure, which is different from the $TiO_6^{8-}$ structure of $BaTiO_3$ around it.

Next, with the multi-layer ceramic capacitor 1 conforming to the present invention, the internal electrode layers 13 are embedded in such a way that their ends are exposed alternately on the end faces of the dielectric layers 12 in the length direction. The exposed parts of the internal electrode layer 13 at the ends are connected to the external electrodes 20.

In addition, the thickness of the dielectric layer 12 is normally 3 µm or less, or preferably 0.5 to 1 µm, while the thickness of the internal electrode layer 13 is normally 0.5 to 3 µm. With the multi-layer ceramic capacitor 1 proposed by the present invention, barium titanate grain crystal that primarily constitutes the dielectric layer 12 is normally controlled to an average grain size of 800 nm or less and, as mentioned earlier, fresnoite phase in the dielectric layer 12 is also controlled to a small average grain size of 1 µm or less, and consequently excellent smoothness is achieved on the surface of such thin dielectric layer and the obtained multi-layer ceramic capacitor will not easily cause short-circuits and other problems.

EXAMPLES

The present invention is explained in greater detail below using examples, but it should be noted that the scope of the present invention is not limited to these examples in any way.

A $BaTiO_3$ powder was prepared as a primary constituent, and $SiO_2$, MgO, $Ho_2O_3$, and MnO were prepared as secondary constituents. They were weighed to the compositions shown in Table 1 below and wet-mixed using a ball mill, after which the mixture was dried and then tentatively calcined at 400° C. to obtain a ceramic powder.

TABLE 1

|  | $BaTiO_3$ | $SiO_2$ | MgO | $Ho_2O_3$ | MnO |
|---|---|---|---|---|---|
| Sample 1 | 100 | 1.5 | 0.5 | 0.4 | 0.1 |
| Sample 2 | 100 | 3 | 0.5 | 0.4 | 0.1 |
| Sample 3 | 100 | 1.5 | 0.3 | 0.4 | 0.1 |

The aforementioned ceramic powder was mixed with polyvinyl butyral resin, toluene, ethanol, and DOP, to prepare a ceramic slurry. This ceramic slurry was formed into a sheet shape using a roll coater, to obtain a dielectric green sheet of 3 µm in thickness.

A Ni internal electrode paste was applied onto this dielectric green sheet by means of screen printing, to form an internal electrode pattern. Twenty one pieces of ceramic green sheets thus obtained were laminated and pressure-bonded and then cut to multiple sections, each of 4.0×2.0 mm in size, to form raw chips.

Such raw chip was placed in a nitrogen ambience to remove the binder, after which a Ni external electrode paste was applied onto the raw chip and then the chip was sintered for 2 hours at 1300° C. in a reducing ambience. The sintered chip was further given re-oxidization treatment at 1000° C., to obtain a multi-layer ceramic capacitor of 3.2×1.6 mm in size and 2 um in dielectric layer thickness.

The obtained multi-layer ceramic capacitor was measured for capacitance using an LCR meter (HP4284 by Hewlett-Packard), and the specific dielectric constant was calculated from the dielectric layer thickness and effective electrode area.

Furthermore, high-temperature accelerated life test was conducted (n=15) as a way to evaluate insulation reliability, and the life was calculated as an average time the sample multi-layer ceramic capacitors took before their resistance dropped to 1 MΩ or below under a load of 150° C. and 25 V/µm.

Furthermore, dielectric layers were cut out from these sample multi-layer ceramic capacitors (samples 1 to 3), respectively, for observation with a transmission electron microscope (TEM). The cutouts were made thinner to a thickness of 200 nm according to the Ar ion-milling method, to check for presence or absence of fresnoite phase in combination with EDS composition analysis.

Here, 20 view fields (15 µm×15 µm) were randomly selected and checked with a TEM-EDS and the percentage occupied by the fresnoite phase was obtained in each field from the area ratio of the fresnoite phase to the entire dielectric layer, and the average of these view fields was evaluated as the abundance of fresnoite phase.

The results are shown in Table 2 below. The results of TEM-EDS composition analysis are also shown in Table 2.

TABLE 2

|  | Specific dielectric constant | Average life | Abundance of fresnoite phase | Average grain size of fresnoite phase |
|---|---|---|---|---|
| Sample 1 | 3000 | 12 h. | 0.0% | —* |
| Sample 2 | 4400 | 20 h. | 0.5% | 0.43 µm |
| Sample 3 | 4300 | 22 h. | 1.0% | 0.77 µm |

Based on the above results, a fresnoite phase with an average grain size of 1 µm or less was present in the dielectric layer, which allows the multi-layer ceramic capacitor to achieve a high dielectric constant and high insulation property (high reliability).

DESCRIPTION OF THE SYMBOLS

1 Multi-layer ceramic capacitor
10 Ceramic sintered compact
11 Laminate
12 Dielectric layer
13 Internal electrode layer
15 Cover layer
20 External electrode
32 Fresnoite phase
34 Dielectric grain
36 Internal electrode

The invention claimed is:
1. A multi-layer ceramic capacitor having a laminate of dielectric layers and internal electrode layers laminated alternately with one another, as well as cover layers formed as outermost layers at a top and bottom of the laminate in a laminating direction, wherein:

the dielectric layers are constituted by a sintered compact containing a barium titanate and a silicon compound; and a fresnoite phase having an average grain size of 1µm or less is present in the dielectric layers, wherein an abundance of fresnoite phase in the dielectric layers is 0.5 to 3%, said abundance being defined as an average ratio of an area of the fresnoite phase to the entire area observed in a cross section of the dielectric layer.

2. A multi-layer ceramic capacitor according to claim 1, wherein the fresnoite phase is at least partially present on an interface between the dielectric layer and internal electrode layer.

3. A multi-layer ceramic capacitor according to claim 2, wherein the dielectric layers contain 0 to 4 mol of magnesium oxide per 1 mol of the silicon compound.

4. A multi-layer ceramic capacitor according to claim 2, wherein the silicon compound is silicon dioxide.

5. A multi-layer ceramic capacitor according to claim 2, wherein the silicon compound is contained by 0.5 to 5 mol per 100 mol of the barium titanate in the dielectric layers.

6. A multi-layer ceramic capacitor according to claim 2, wherein the dielectric layers further contain oxides of rare earth elements.

7. A multi-layer ceramic capacitor according to claim 1, wherein the dielectric layers contain 0 to 4 mol of magnesium oxide per 1 mol of the silicon compound.

8. A multi-layer ceramic capacitor according to claim 7, wherein the silicon compound is silicon dioxide.

9. A multi-layer ceramic capacitor according to claim 7, wherein the silicon compound is contained by 0.5 to 5 mol per 100 mol of the barium titanate in the dielectric layers.

10. A multi-layer ceramic capacitor according to claim 7, wherein the dielectric layers further contain oxides of rare earth elements.

11. A multi-layer ceramic capacitor according to claim 1, wherein the silicon compound is silicon dioxide.

12. A multi-layer ceramic capacitor according to claim 11, wherein the silicon compound is contained by 0.5 to 5 mol per 100 mol of the barium titanate in the dielectric layers.

13. A multi-layer ceramic capacitor according to claim 11, wherein the dielectric layers further contain oxides of rare earth elements.

14. A multi-layer ceramic capacitor according to claim 1, wherein the silicon compound is contained by 0.5 to 5 mol per 100 mol of the barium titanate in the dielectric layers.

15. A multi-layer ceramic capacitor according to claim 1, wherein the dielectric layers further contain oxides of rare earth elements.

16. A multi-layer ceramic capacitor according to claim 1, wherein the fresnoite phase is expressed by the formula $Ba_{2-x-y}Ca_xSr_yTi_{1-z}Zr_zSi_2O_8$ ($0 \leq x < 2$, $0 \leq y < 2$, $0 \leq x+y < 2$, $0 \leq z < 1$).

17. A multi-layer ceramic capacitor having a laminate of dielectric layers and internal electrode layers laminated alternately with one another, as well as cover layers formed as outermost layers at a top and bottom of the laminate in a laminating direction, wherein:

the dielectric layers are constituted by a sintered compact containing a barium titanate and a silicon compound; and a fresnoite phase having an average grain size of 1 µm or less is present in the dielectric layers, wherein the fresnoite phase is at least partially present on an interface between the dielectric layer and internal electrode layer, wherein an abundance of fresnoite phase in the dielectric layers is 0.5 to 3%, said abundance being defined as an average ratio of an area of the fresnoite phase to the entire area observed in a cross section of the dielectric layer.

18. A multi-layer ceramic capacitor having a laminate of dielectric layers and internal electrode layers laminated alternately with one another, as well as cover layers formed as outermost layers at a top and bottom of the laminate in a laminating direction, wherein:

the dielectric layers are constituted by a sintered compact containing a barium titanate and a silicon compound; and a fresnoite phase having an average grain size of 1 µm or less is present in the dielectric layers, wherein the dielectric layers contain 0 to 4 mol of magnesium oxide per 1 mol of the silicon compound, wherein an abundance of fresnoite phase in the dielectric layers is 0.5 to 3%, said abundance being defined as an average ratio of an area of the fresnoite phase to the entire area observed in a cross section of the dielectric layer.

19. A multi-layer ceramic capacitor having a laminate of dielectric layers and internal electrode layers laminated alternately with one another, as well as cover layers formed as outermost layers at a top and bottom of the laminate in a laminating direction, wherein:

the dielectric layers are constituted by a sintered compact containing a barium titanate and a silicon compound; and a fresnoite phase having an average grain size of 1 µm or less is present in the dielectric layers, wherein the silicon compound is silicon dioxide, wherein an abundance of fresnoite phase in the dielectric layers is 0.5 to 3%, said abundance being defined as an average ratio of an area of the fresnoite phase to the entire area observed in a cross section of the dielectric layer.

20. A multi-layer ceramic capacitor having a laminate of dielectric layers and internal electrode layers laminated alternately with one another, as well as cover layers formed as outermost layers at a top and bottom of the laminate in a laminating direction, wherein:

the dielectric layers are constituted by a sintered compact containing a barium titanate and a silicon compound; and a fresnoite phase having an average grain size of 1 µm or less is present in the dielectric layers, wherein the silicon compound is contained by 0.5 to 5 mol per 100 mol of the barium titanate in the dielectric layers, wherein an abundance of fresnoite phase in the dielectric layers is 0.5 to 3%, said abundance being defined as an average ratio of an area of the fresnoite phase to the entire area observed in a cross section of the dielectric layer.

* * * * *